(12) United States Patent
Sun

(10) Patent No.: US 6,320,828 B1
(45) Date of Patent: Nov. 20, 2001

(54) SERVO SYSTEM HAVING TRACK CROSSING DETECTION FOR AN OPTICAL DISK DRIVE SYSTEM

(75) Inventor: Kai C. K. Sun, deceased, late of Saratoga, CA (US), by Linda S. L. Sun, executrix

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/347,373

(22) Filed: Jul. 6, 1999

Related U.S. Application Data

(63) Continuation of application No. 09/189,315, filed on Nov. 10, 1998, now abandoned.

(51) Int. Cl.[7] .................................................. G11B 7/085
(52) U.S. Cl. ..................................... 369/44.28; 369/53.29
(58) Field of Search .............................. 369/44.28, 53.28, 369/53.29

(56) References Cited

U.S. PATENT DOCUMENTS

| | | | |
|---|---|---|---|
| 5,038,334 | * | 8/1991 | Uchikoshi et al. ............... 369/44.28 |
| 5,121,370 | * | 6/1992 | Yanagi .......................... 369/44.28 X |
| 5,796,686 | * | 8/1998 | Maeda ............................. 369/44.28 |

* cited by examiner

Primary Examiner—W. R. Young
(74) Attorney, Agent, or Firm—Townsend and Townsend and Crew LLP

(57) ABSTRACT

A difference counter in a servo system includes RX signal processing circuitry, TX signal processing circuitry, and a latch. The RX processing circuitry includes a RX z-hold (zero order) circuit, a RX delay circuit coupled thereto, and a RX XOR logic circuit coupled thereto for producing an RX processed signal. The TX processing circuitry includes a TX z-hold circuit, a TX delay circuit coupled thereto, and a TX XOR logic circuit coupled thereto for producing an TX processed signal. The RX and TX processed signals are fed into the latch which, in response, generates a noise-free quarter track signal. Half and full track signals are generated therefrom to further process the signal track information.

2 Claims, 4 Drawing Sheets

SERVO SYSTEM HAVING TRACK CROSSING DETECTION FOR AN OPTICAL DISK DRIVE SYSTEM

This application is a continuation of U.S. application Ser. No. 09/189,315, filed Nov. 10, 1998, now abandoned, the disclosure of which is incorporated by reference.

BACKGROUND OF THE INVENTION

This invention pertains to a track search servo system in an optical disk drive, and more particularly to an improved method and apparatus for detecting track crossings during CD-ROM search operations.

Optical disk drive systems operate by storing and retrieving information on an optical storage medium at various track locations within the media. The system typically employs a track search operation in which a track is quickly located to store or retrieve the desired information. The search operation typically employs a process by which the number of track crossings are counted until the targeted track is reached. Using this technique, the distance traveled and the velocity of the head can be precisely controlled.

FIG. 1 shows a simplified block diagram of a conventional optical disk drive system 10. Optical disk 12, such as a CD-ROM is driven by spindle motor 14 under control of spindle motor control circuity 16. Optical pickup unit 20 retrieves or records information to/from disk 12 by means of photodiodes (not shown) properly placed above/below the desired track of the CD-ROM 12, the location of the pickup unit 20 being precisely positioned by feed motor 22. In addition, the pickup unit 20 provides a tracking error signal (TE) in order for the disk drive to maintain proper radial tracking.

Microprocessor 40 communicates with host computer 50 and, in turn, controls spindle motor 16, focusing servo 26, which in turn, controls the pickup unit 20 and tracking servo 24, which in turn, controls feed motor 22. The output signals from the pickup unit 20 are fed to focusing servo 26 and tracking servo 24 to aid in their operation, as well as the data processing circuity 30 for extracting data which is feed via BUS 44 to host computer 50, and signals for use by microprocessor 40 and spindle motor control circuity 16 for their operations.

The optical drive system typically operates in a coarse tracking mode initially to locate the desired track. During coarse tracking, microprocessor 40 calculates the difference between the current track of the CD-ROM 12 and the target track and determines the direction of movement. The difference calculated is the remaining distance the pickup unit 20 must travel to arrive at the target track, the difference being loaded into a counter in the servo system. A tracking servo 24 then drives the pickup unit 20 in the desired direction. The pickup unit 20 provides the tracking error signal (TE), which, when the pickup unit 20 is traversing the disk, is a sinusoidal waveform having a zero crossing whenever the pickup unit passes a track center. One cycle of the TE signal represents crossing of one track. Using the TE signal, the tracking servo system determines when the pickup unit crosses a track and decrements a counter by one.

The tracking servo continues to drive the pickup unit until the counter decrements to zero. At this point, the pickup unit reads the current track information and commences a fine search operation to arrive at the target track. It can be appreciated that the servo system must detect track crossing accurately so that the counter will decrement correctly. If, due to erroneous track crossing detection, the track counter miscounts, the pickup unit is grossly mis-positioned and the system has to re-seek, increasing the seek time significantly.

To generate accurate track crossing counts, prior art servo systems utilize the tracking error crossing signal TX and a quadrature signal RX. The TX signal is the digitized waveform of the tracking error signal TE. The quadrature signal RX is the digitized waveform of the radio frequency ripple signal RFRP. The RFRP signal is derived from the summed output of the photodiodes (within the pickup unit 20) which detects the reflected main laser beam.

When the pickup unit is positioned above/below a track center, the summed signal is the data signal and contains high frequency components. When the pickup unit is traversing the disk during the search operation, the summed signal becomes modulated. The modulation of this summed signal is a sinusoidal waveform 90° out of phase with the tracking error signal TE. The RFRP signal is generated by filtering the high frequency components from of the summed signal, and when digitized, yields the RX signal.

Unfortunately, both the TX and RX signals are prone to noise contamination. This is especially true for the RX signal since it is derived from a data signal containing high frequency components. Noise and glitches in the RX and TX signals can lead to erroneous track crossing detection.

One commonly encountered problem is detection of multiple track crossings. This occurs when transients in the TE signal are recognized as additional zero-crossings which are translated into additional transitions when the TE signal is digitized into TX. Thus, multiple zero crossings can be erroneously generated for each legitimate track crossing. The erroneous TX signal generated causes the counter to miscount and the pickup unit to arrive at the wrong track.

What is needed is a servo system and method for accurately detecting the number of disk track crossings.

SUMMARY OF THE INVENTION

The present invention provides a servo system having an accurate track crossing detection capability. The servo system of the present invention generates a noise free quarter track signal from noise contaminated RX and TX signals. Half and full track signals which are used to further process track information are derived from the noise free quarter track signal, thereby improving seek time and reducing the need for re-seek operations.

In one embodiment, the servo system includes an optical pickup for producing the RX and TX signals and a difference counter for providing track information based upon the RX and TX signals. The difference counter includes RX signal processing circuitry, TX signal processing circuitry, and a latch. The RX processing circuitry includes a RX z-hold (zero order) circuit, a RX delay circuit coupled thereto, and a RX XOR logic circuit coupled thereto for producing an RX processed signal. The TX processing circuitry includes a TX z-hold circuit, a TX delay circuit coupled thereto, and a TX XOR logic circuit coupled thereto for producing an TX processed signal. The RX and TX processed signals are fed into the latch which, in response, generates a noise-free quarter track signal. Half and full track signals are generated therefrom to further process the signal track information.

Additional objects and features of the invention will be more readily apparent from the following detailed description and appended claims when taken in conjunction with the following drawings.

DESCRIPTION OF THE SPECIFIC EMBODIMENTS

Figure 1:
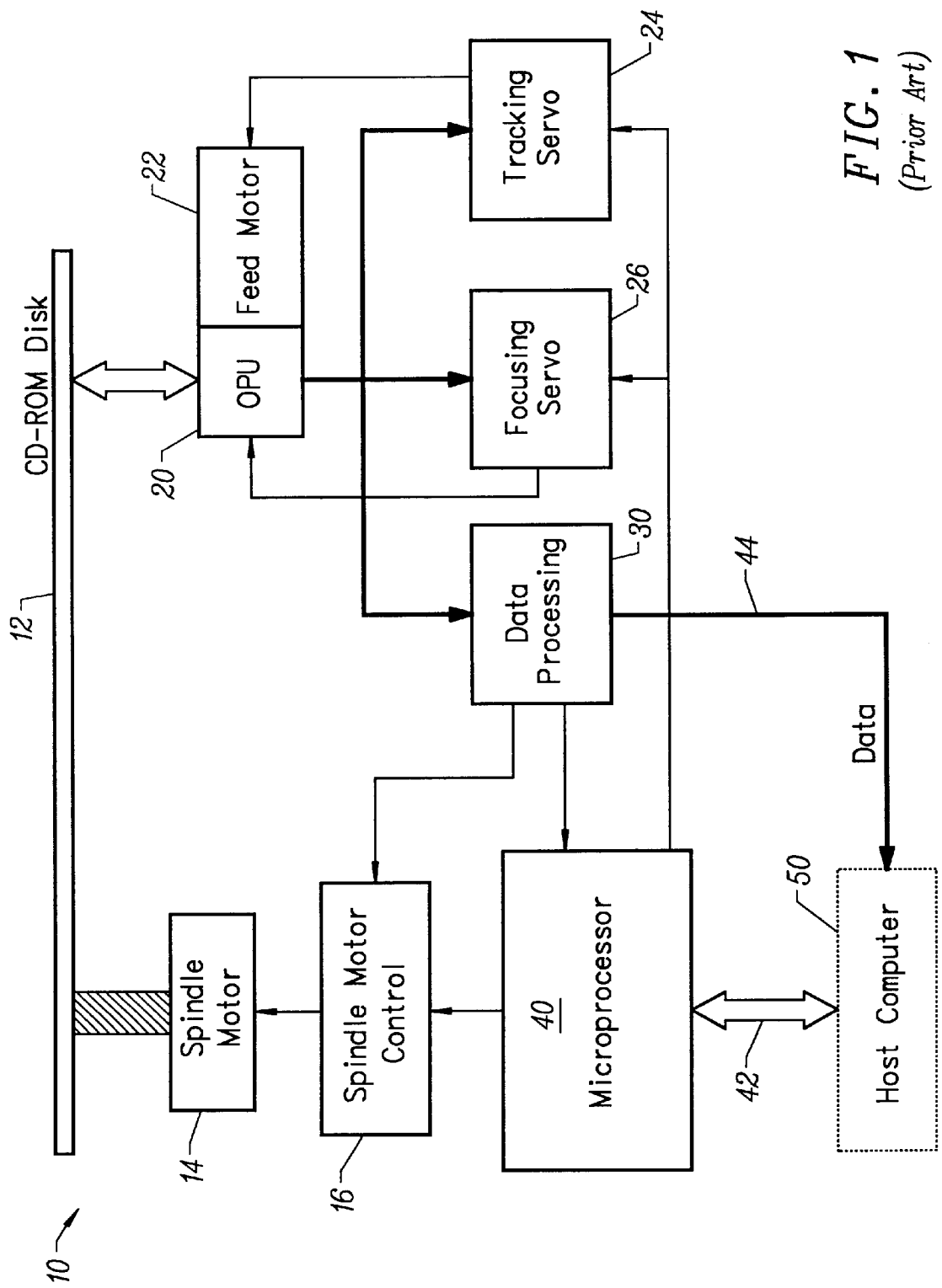
FIG. 1 illustrates a simplified block diagram of a conventional optical disk drive system.
Figure 2:
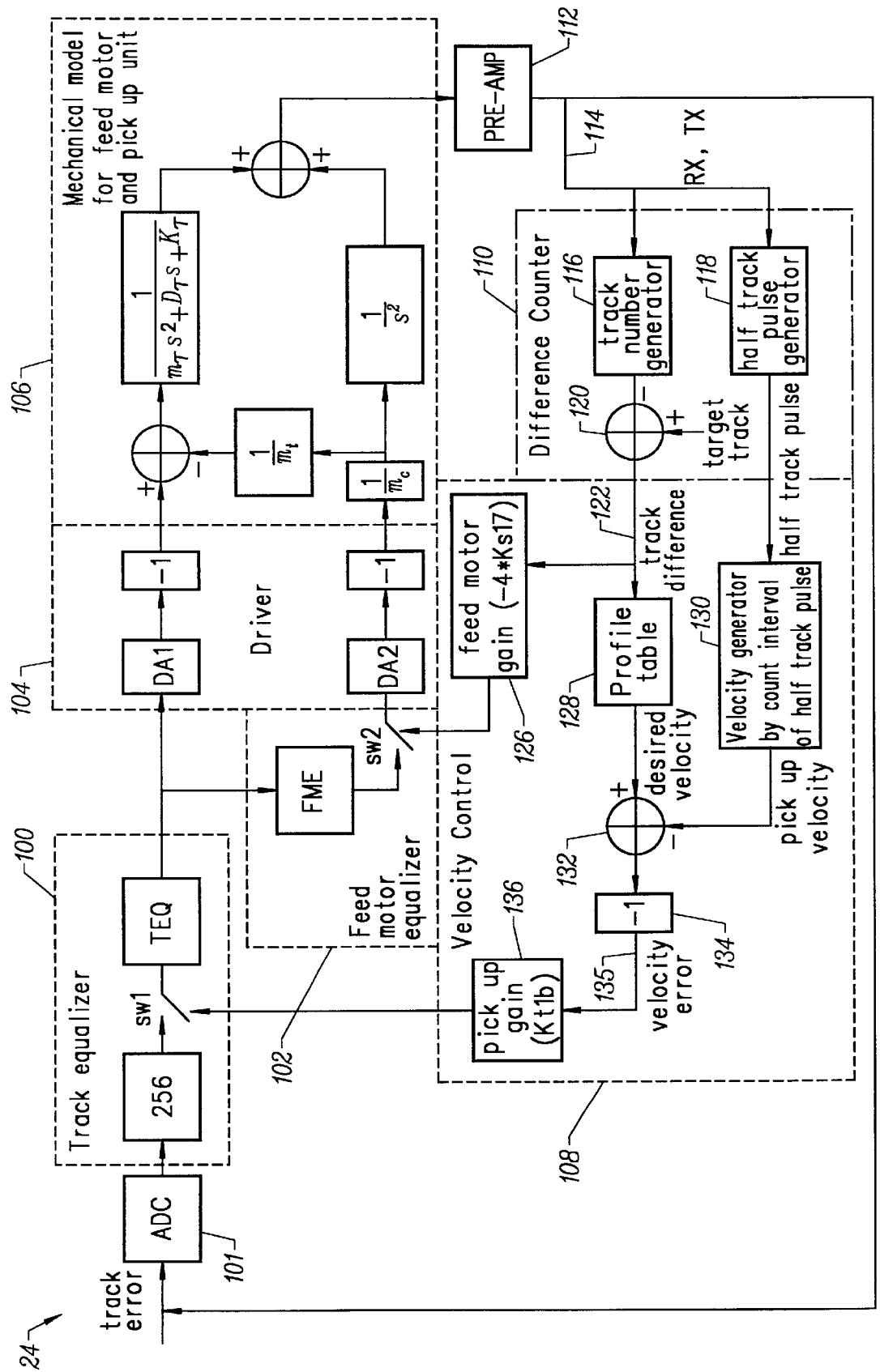
FIG. 2 illustrates a block diagram of the tracking servo system in accordance with the present invention.

Referring to FIG. 2, there is shown a block diagram of the tracking servo system of the present invention. The track servo system 24 includes a track equalizer 100, a feed motor equalizer 102, a driver 104, a velocity control block 108, and a difference counter 110. The driver 104 is disposed to control the operation of the feed motor which in turn controls the movement of pickup unit. The driver 104 receives inputs from the track equalizer 100 and the feed motor equalizer 102. A mechanical model for the feed motor and the pickup unit is represented by block 106. The pickup unit 106 outputs an track error (TE) signal, which is amplified by pre-amplifier 112. The TE signal is feed to an analog-to-digital converter (ADC) 101, digitizing the TE signal. The digitized TE signal is subsequently fed into the track equalizer 100.

The track equalizer 100 and the feed motor equalizer 102 issue commands to the driver 104 causing it to operate either in (1) a track following mode or (2) a velocity mode. In the track following mode, the pickup unit has arrived at the desired track and is retrieving data from the CD-ROM disk. The track equalizer 100 provides a control signal to the driver 104 based on the tracking error signal to keep the pickup unit properly on track. Similarly, the feed motor equalizer 102 operates to fine tune the position of the pickup unit so that it is aligned to the center of the desired track.

In the velocity mode, the disk drive is performing a track search operation. The driver 104 moves the pickup unit either inwardly or outwardly across the disk to search for the desired track. The velocity control block 108 and the difference counter 110 are disposed to carry out the track search operation.

The pickup unit 106 also outputs the aforementioned TX and RX signals. As previously described, the TX and RX signals are track crossing signals derived from the TE signal and the modulated data signal. The TX and RX signals are amplified using the preamplifier 112 and digitized via an analog-to-digital converter (not shown) for subsequent processing within the difference counter 110.

Figure 4:
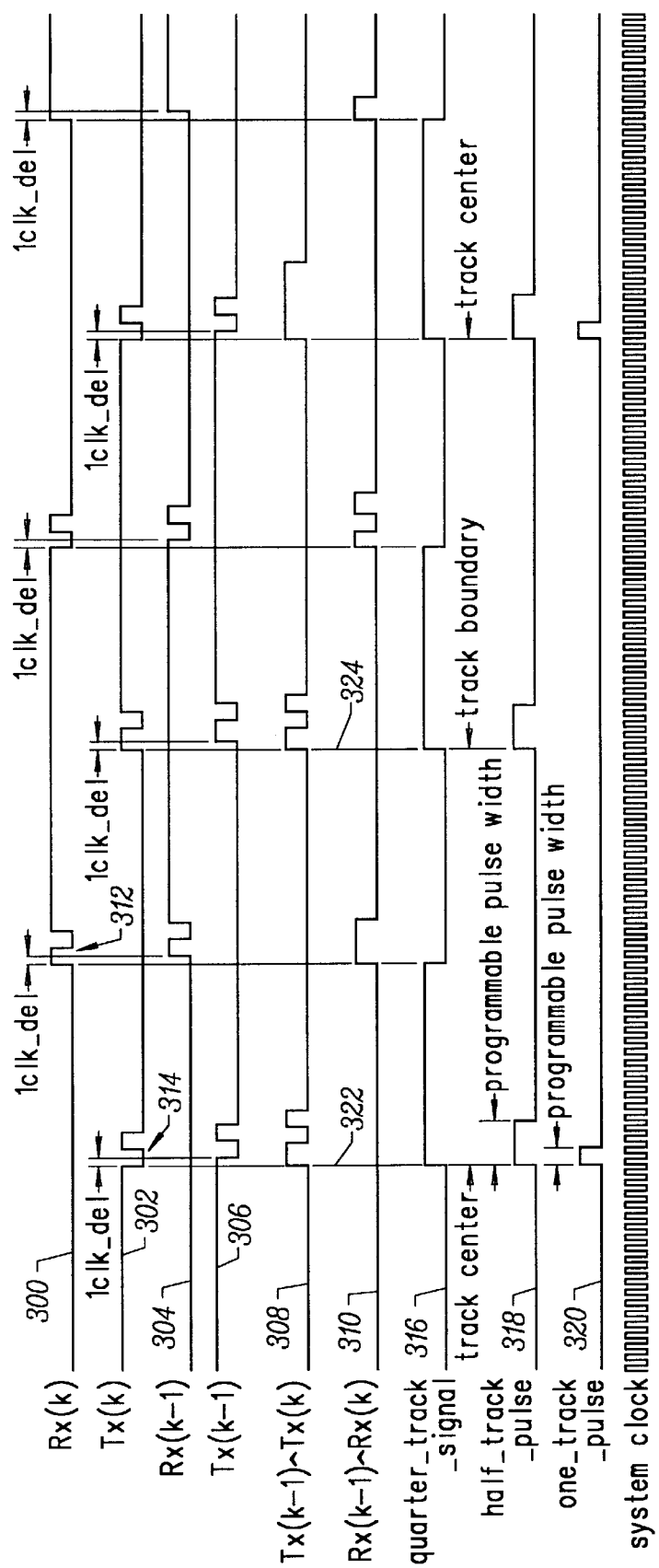
FIG. 4 illustrates the signal waveforms associated with the difference counter.

FIG. 4 illustrates the waveform characteristics of the digitized TX and RX signals. Both the TX and RX signals may be contaminated with noise. Referring to FIG. 4, arrows 312 and 314 indicate places where the TX and Rx signals should make a single transition from one level to another. Instead, the transitions contain several glitches due to, for instance, the pre-amplifier 112 detecting multiple zero-crossings. The difference counter 110 generates an accurate track crossing count and accurate half track pulses even when the TX and RX signals are corrupted with noise.

Referring back to FIG. 2, the difference counter 110 comprises a track number generator 116, a half track pulse generator 118, and a subtractor 120. The track number generator 116 detects track crossings and generates a track crossing count. The track crossing count is supplied to the negative terminal of the subtractor 120. The positive terminal of the subtractor 120 is supplied with the target track number. Thus, the output of the subtractor 120 is a track difference signal 122 which represents the difference between the current track and the target track, in other words, the remaining tracks to be traveled.

The value of track difference signal 122 is decremented whenever the track number generator 116 detects a track crossing. The difference counter 110 provides track difference signal 122 to the velocity control block 108 to determine the optimal velocity for the pickup unit. The half track pulse generator 118 of the difference counter 110 generates pulses with variable pulse width at an interval of one-half track. Thus, a half track pulse 124 occurs at every track center and at every track boundary as illustrated by the signal waveform 318 in FIG. 4.

The half track pulse 124 is supplied to the velocity control block 108 for determining the actual velocity of the pickup unit. A quarter track or full track signal could also be used to determine the pickup unit velocity as well. The velocity control block 108 provides control signals to the feed motor equalizer 102 and the track equalizer 100 when the disk drive is performing a track search operation. A feed motor gain circuit 126 amplifies the track difference signal 122 and supplies it to the driver circuit 104 via feed motor equalizer 102.

The track difference signal 122 and half track pulse 124 are also used to fine tune the velocity of the pickup unit. The desired velocity of the pickup unit is a function of the traversal distance. The values of the desired velocity for each value of traversal distance is stored in a profile table 128. The profile table 128 looks up the desired velocity based on the track difference signal 122 and supplies the desired velocity to the positive terminal of a subtractor 132. The current velocity of the pickup unit is determined by the velocity generator block 130.

The velocity generator block measures the width of the interval between the half track pulses and derives the current velocity of the pickup unit. The current velocity of the pickup unit is coupled to the negative terminal of the subtractor 132. The output of the subtractor 132, representing the difference between the desired velocity and the actual velocity, is inverted by invertor 134 to yield a velocity error signal 135. The velocity error signal 135 is fed to the pickup gain block 136 to generate the control signal for the track equalizer 100. Again, generated quarter or one track signals may also be used instead of the half track signal.

The operation of the difference counter 110 is further illustrated with reference the schematic diagram in FIG. 3 and the corresponding waveforms in FIG. 4. To provide accurate track crossing detection, the difference counter 110 first generates a clean and accurate quarter track signal. The quarter track signal is subsequently used to generate a half track pulse for determining the velocity of the pickup unit, and a one track pulse for decrementing the counter.

The quarter track signal is generated by qualifying the TX signal with the RX signal. The qualification process limits one TX transition for each RX high level and each RX low level, and similarly for RX transitions. The qualification process is accomplished in two steps. First, two trigger signals $R_{trig}$ and $T_{trig}$ are generated according to the following relationships:

$$R\text{trig} = RX(k) \oplus RX(k-1) \tag{1},$$

and $$T\text{trig} = TX(k) \oplus TX(k-1) \tag{2};$$

where $\oplus$ represents an exclusive or logical operation and where RX(k) represents the value of RX at time k and RX(k−1) represents the value of RX at one clock cycle prior to time k; similarly for TX.

Figure 3:
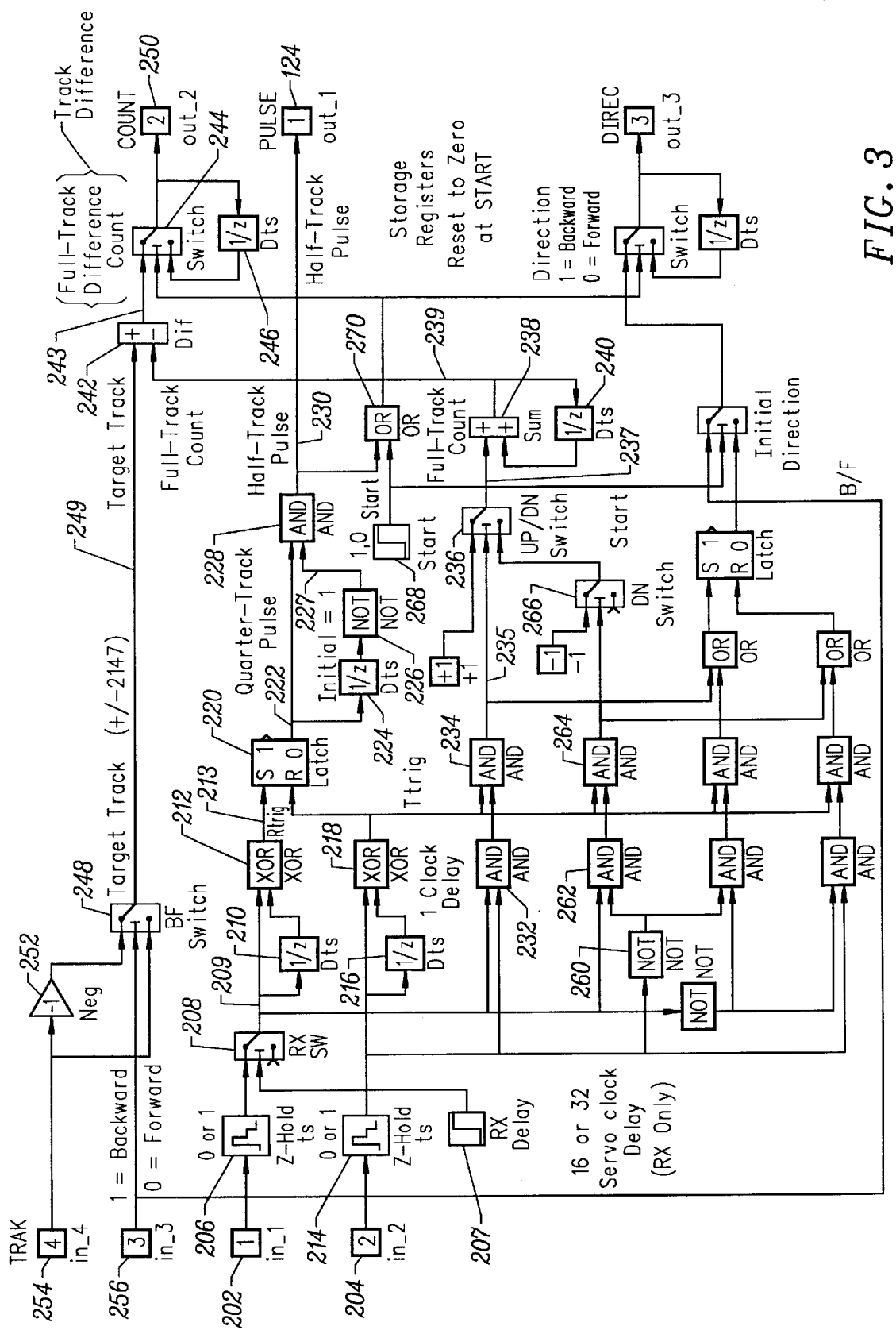
FIG. 3 illustrates a schematic diagram of the difference counter in accordance with the present invention.

FIG. 3 illustrates the implementation of the difference counter 110. The RX signal is coupled to the difference counter 110 through input pad 202. RX is coupled to a Z-Hold (zero-order hold) circuit 206. The output of the Z-Hold circuit 206 is then supplied to a RX switch circuit 208. The adjusted RX signal 209 is then supplied to a delay circuit 210 which introduces a one-clock delay to RX. The original RX signal and the delayed RX signal are then supplied to an XOR circuit 212 whose output represents the $R_{trig}$ signal 213. $T_{trig}$ is generated in a similar fashion. TX is supplied to the difference counter through input pad 204. TX then passes through a Z-Hold circuit 214. TX is then supplied directly to a delay circuit 216 introducing a one-clock delay to TX. The original TX and the delayed TX are coupled to an XOR circuit 218 to generate $T_{trig}$ 219. The representative waveforms of the $R_{trig}$ and $T_{trig}$ signals are illustrated in FIG. 4 as lines 310 and 308 respectively.

The second step involves constructing the quarter track signal using $R_{trig}$ and $T_{trig}$. The operation involves using $R_{trig}$ to reset the quarter track signal and using $T_{trig}$ to set the quarter track signal. The implementation of this operation is again illustrated in FIG. 3. Here, $R_{trig}$ 213 is connected to the set terminal and $T_{trig}$ is connected to the reset terminal of latch 220. The quarter track signal 222 is derived from the inverted output of the latch 220. The quarter track signal generated in this manner is free of glitches and nose and has clean transitions at each quarter track interval, as illustrated by line 316 in FIG. 4.

After generating the quarter track signal 222, the difference counter 110 proceeds to generate the half track pulse 230. The quarter track signal 222 is coupled to a delay circuit 224 and an inverter 226. The delayed inverted quarter track signal 227 is supplied to an AND gate 228 together with the original quarter track signal 222. The output of the AND gate 228 is the half track pulse 230. In operation, each rising edge of the quarter track signal yields one pulse and the pulses occur in a half track interval. The width of the half track pulse 230 can be adjusted by programming the length of delay at the delay circuit 224. The longer the length of the delay, the wider the pulse width.

Line 318 in FIG. 4 illustrates the waveform characteristics the half track pulse 318 where pulses occur at each track center (line 322) and at each track boundary (line 324). The half track pulse 318 is derived from the noise-free quarter track signal 316 to measure the pickup unit's velocity. As illustrated, the half track pulse 318 propagates without noise despite noise on the TX or RX signals 300 and 302, respectively.

The difference counter 110 also generates a one track pulse for use in decrementing the track number counter. Referring again to FIG. 3, the adjusted RX signal 209 and the TX signal 215 are supplied to an AND gate 232. The output is fed to another AND gate 234 together with $T_{trig}$ 219. The result of the two AND operations, output 235, is a signal which preserves the $T_{trig}$ pulses at each track boundary. The output 235 forms the control for the up/down switch 236.

When output 235 is at a high level, that is at $T_{trig}$ pulses, the up/down switch 236 switches to the up terminal and passes a high level to the output 237. When output 235 is at a low level, that is at Ttrig low, the up/down switch 236 switches to the down terminal and passes the output of down switch 266 to the output 237. The control for down switch 266 is derived from two AND gates 262 and 264. The adjusted RX 209 is ANDed with the inverse of TX 215, and the output is then ANDed with $T_{trig}$. The output 237 is the one track pulse with one pulse at each track boundary. Line 320 in FIG. 4 illustrates the resulting one track pulse waveform at output 237.

After generating the one track pulse, the difference counter 110 carries out track count operation as follows. The one track pulse is supplied to a summing circuit 238. The summing circuit 238 has a feed back loop through delay circuit 240. The summing circuit 238 adds the number of one track pulse appearing at output 237 which constitutes the total number of track crossings encountered by the pickup unit. The output of the summing circuit 238 is the full track count 239 and it is supplied to the negative terminal of a subtractor circuit 242. The positive terminal of the subtractor circuit 242 is loaded with the signed value of the target track 249 through the B/F switch 248. If the pickup unit has to move in the forward direction to reach the target track, the signed target track 249 is a positive number. If the pickup unit has to move in the backward direction, the signed target track 249 is a negative number. The output 243 of the subtractor circuit 242 is the track difference, representing the remaining tracks to be crossed.

The output 243 is connected to the up terminal of an up/down switch 244. The control of the switch 244 is the ORed output of the start signal 268 and the half track pulse 230. The switch output 250 is fed back to the down terminal of the switch 244 through a delay circuit 246. When the counter is in operation, the switch 244 samples the up terminal, that is the track difference 243, at the start of the operation and at each half track pulse interval and output the track difference 243. Otherwise, the output 250 sustains the prior value through the delay circuit 246. In the described manner, the difference counter provides an accurate track difference based on a clean and reliable one track pulse.

While the above is a complete description of the preferred embodiments of the invention, various alternatives, modifications, and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. In a tracking servo system having a track equalizer for processing track error signal, and a feed motor/pickup unit assembly coupled to track equalizer for producing a quadrature signal RX and a tracking error crossing signal TX in response to the tracking error signal, a difference counter coupled to the feed motor/pick up unit and to the track equalizer for providing track information based upon a quarter track signal, the difference counter comprising:

a RX z-hold circuit (206) which receives said RX signal;

a RX delay circuit (210) coupled to said RX z-hold circuit;

a RX XOR logic circuit (212) coupled to said RX z-hold circuit and to said RX delay circuit;

a TX z-hold circuit (214) which receives said TX signal;

a TX delay circuit (216) coupled to said TX z-hold circuit;

a TX XOR logic circuit (218) coupled to said TX z-hold circuit and to said TX delay circuit; and a latch (220) coupled to said RX XOR logic circuit and to said TX XOR logic circuit for generating said quarter track signal.

2. In a disk drive system for retrieving data disposed on a plurality of tracks formed on a disk, a method for detecting the number of tracks crossed comprising the steps of:

(a) generating a quarter track signal comprising the steps of:
providing a first quadrature signal RX at a first time;
providing a second RX signal at a subsequent time;
generating a $R_{trig}$ signal by performing a XOR logical function on said first and second RX signals;
providing a first tracking error crossing signal TX at a first time;
providing a second TX signal at a subsequent time;
generating a $T_{trig}$ signal by performing a XOR logical function on said first and second TX signals;
providing a latch circuit having a set input, a reset input, and an output;
supplying said $R_{trig}$ signal to said set input;
supplying said $T_{trig}$ signal to said reset input;
generating an output from said latch circuit;

(b) therefrom, generating a half track signal;

(c) generating a full track signal using the $T_{trig}$ signal, RX signal, and TX signal; and (d) indicating a track crossing when said full track signal is generated.

* * * * *